(12) United States Patent
Luciano

(10) Patent No.: US 7,618,228 B2
(45) Date of Patent: Nov. 17, 2009

(54) HEAVY DUTY UNDER LIFT ATTACHMENT FOR VEHICLE TOWING

(75) Inventor: C. Thomas Luciano, Pottersville, NY (US)

(73) Assignee: Miller Industries Towing Equipment Inc, Odetewah, TN (US)

( * ) Notice: Subject to any disclaimer, the term of this patent is extended or adjusted under 35 U.S.C. 154(b) by 103 days.

(21) Appl. No.: 10/977,050

(22) Filed: Oct. 29, 2004

(65) Prior Publication Data

US 2006/0104778 A1 May 18, 2006

(51) Int. Cl.
B60P 3/12 (2006.01)
(52) U.S. Cl. .................. 414/563; 280/402
(58) Field of Classification Search .......... 414/563; 280/402, 414.5; 403/167
See application file for complete search history.

(56) References Cited

U.S. PATENT DOCUMENTS

| | | | |
|---|---|---|---|
| 4,798,509 A | 1/1989 | Bubik | |
| 4,836,737 A | 6/1989 | Holmes et al. | |
| 4,875,269 A | * 10/1989 | Crist | 29/401.1 |
| 2004/0081542 A1 | * 4/2004 | Nolasco et al. | 414/563 |

OTHER PUBLICATIONS

TRAA Vehicle Identification Guide (1 page) (C1).
SAE J-li42 definitions (2 pages) (01-02).
Miller website information re Century SDU/3 (4 pages) (E1-E4).
Miller website information re Challenger Heavy Duty Series (2 pages, F1, F2).
Miller website information re Century Formula III/T Series (3 pages, G1-G3).

* cited by examiner

*Primary Examiner*—Michael S Lowe
(74) *Attorney, Agent, or Firm*—Michael P. Mazza, LLC

(57) ABSTRACT

Lift adaptors for the hook-up and towing of heavy vehicles such as buses, coaches and trucks in a damage-free fashion, avoiding the need for pre-picking. The lift adaptors may be mounted to receivers slidable over the underlift crossbar of heavy-duty, underlift-type tow vehicles. An engagement end of the lift adaptors may be secured to the underside portion of a vehicle to be towed, using an eye bracket, apertures or another attachment mechanism. A movable boom may be used to locate the crossbar in a proper position beneath the towed vehicle, enabling engagement to the lift adaptors. The lift adaptors are preferably designed for quick decoupling in the field so that they may be replaced with forks or other hook-up or towing attachment mechanisms.

16 Claims, 10 Drawing Sheets

HEAVY DUTY UNDER LIFT ATTACHMENT FOR VEHICLE TOWING

BACKGROUND OF THE INVENTION

The present invention relates to heavy duty under lifts used for buses, coaches, trucks or tractors, for example.

Vehicle recovery has successfully developed damage-free towing operations utilizing, for example, wheel lifts such as those described in U.S. Pat. Nos. 4,836,737 and 4,798,509. Such lifting apparatus is not suitable for the recovery of heavy vehicles such as buses, coaches (motorhomes, large recreational vehicles), large trucks or tractors.

Heavy duty wheel lifts are available. However, these are fairly time-consuming to hook-up. Also, special installation is required for their use, and towers may not desire this.

Heavy-duty recovery vehicles may be called upon to lift and tow Class 7 (26,000-33,000 pounds) and Class 8 (over 33,000 pounds) disabled vehicles. For certain towing operations, such underlift vehicles may be outfitted with heavy duty wheel lifts. Large vehicle recovery trucks known as heavy-duty "underlifts" have been developed for towing heavy vehicles, such as the Challenger Heavy Duty Series underlift 10 available from Miller Industries and shown in FIG. 16 (although the lift adaptor 20 is part of the present invention and is not prior art). These underlifts have rugged, heavy-duty wheel lifts or underlifts which may be fitted with forks or other apparatus for towing applications.

The towing of heavy vehicles using underlifts has long suffered from several problems. Towing of such vehicles is commonly prefaced by pre-picking them. "Pre-picking" involves extending the underlift of the towing vehicle, initially without the use of forks, and picking up the vehicle on the bottom of its front or rear axle, engine frame, floor pan or cross members. Because these items may be offset to one side, pre-picking usually does not result in an even lift. Once lifting has been accomplished in this fashion, wooden blocking is placed under the tires of the vehicle to be towed. Blocked, the towed unit is at a sufficient height to allow the underlift, now fitted with forks, to be engaged for towing. However, the use of wooden blocking is a safety issue, as the towed vehicle can roll or slide off the blocking. Underlift forking may damage the air bags, air dryers, suspension parts, engine, coolant lines, transmission, wheel chair access mechanisms, etc., of the towed vehicle. Thus, pre-picking can be a time-consuming and labor-intensive operation, and may also result in damage to fragile suspension parts of the towed vehicle.

In addition to these problems, excessive hook-up time may jeopardize safety, and the use of existing heavy duty underlifts can result in excessive overhang. Given the disabled vehicle weights involved, a substantial overhang, such as much as 18 feet, may occur when lifting and towing heavy vehicles. In addition, as overhang increases towed vehicle turning can result in overswing into an adjacent lane(s) occurs.

Accordingly, there is a need in the heavy-duty vehicle towing field for apparatus facilitating the safe and efficient hook-up and towing of heavy vehicles such as buses, coaches, trucks and tractors that eliminates the problem of excessive overhang, speeds hook-up times, provides safer working conditions, and minimizes damage to the towed vehicle, as compared to the use of current, heavy-duty wheel lift and underlift systems.

DEFINITION OF CLAIM TERMS

The following terms are used in the claims of the patent as filed and are intended to have their broadest meaning consistent with the requirements of law. Where alternative meanings are possible, the broadest meaning is intended. All words used in the claims are intended to be used in the normal, customary usage of grammar and the English language.

"Eye bracket" means a metal shackle or other connector with apertures for receiving a pin, bolt or other fasteners and that may be used for attaching or interconnecting the lift adaptor of the present invention to an underside portion of a vehicle to be towed.

"Heavy vehicles" means vehicle Classes 7 (26,001-33,000 pounds GVWR (gross vehicle weight rating)) and 8 (33,001 pounds and over, GVWR), per DOT Classification (TRAA Vehicle Identification Guide), which includes a wide range of heavy vehicles, including large delivery trucks, motor coaches/buses, motor homes, refuse trucks, cement mixers, dump trucks, and all tractors, etc.

"Recovery vehicle" means a vehicle to retrieve and, if necessary, lift other tow vehicles.

"Tow" means the act of transporting a vehicle from one point to another by a second vehicle.

"Tow vehicle" means a vehicle used to lift and/or tow other vehicles.

"Underlift" means a device used for towing vehicles by lifting one end of the towed vehicle from under the axle or structural member.

SUMMARY OF THE INVENTION

The objects mentioned above, as well as other objects, are solved by the present invention, which overcomes disadvantages of prior heavy duty vehicle towing apparatus, while providing new advantages not believed associated with such devices.

In a preferred embodiment, a lift adaptor of the present invention may be used by a tow vehicle to tow a second vehicle, such as but not limited to a Class 7 or Class 8 vehicle and/or a bus, coach, truck or tractor, from the rear of the tow vehicle. The tow vehicle may have an underlift crossbar supporting one or more slidable receivers mounting the lift adaptor. The lift adaptor may include an engagement end and a distal end. The distal end of the lift adaptor may be supported by the receiver, while the engagement end of the lift adaptor may be adapted to connect to and support an underside portion of the towed vehicle. An eye bracket may be used to interconnect the underside portion of the towed vehicle with the engagement end of the lift adaptor. In one particularly preferred embodiment, a cylinder and/or a pin may be used to interconnect the engagement end of the lift adaptor with eye bracket 28.

In an alternative embodiment, an eye bracket need not be used, and the engagement end of the lift adaptor may be directly connected to the underside portion of the towed vehicle.

In another embodiment of the invention, a method is provided for towing vehicles such as buses, coaches or trucks using a heavy-duty tow vehicle having an underlift crossbar with a movable boom. The crossbar may include two slidably adjustable receivers, with each of the receivers mounting a lift adaptor. The crossbar may be positioned so that the lift adaptors are each located below an attachment element, such as but not limited to an aperture or eye bracket, located on a frame of a vehicle to be towed. The crossbar may then be raised while maintaining the boom in a position generally parallel to the frame of the towed vehicle, to position an upper portion of each lift adaptor adjacent each eye bracket of the towed vehicle, so that the lift adaptors may be engaged with or without the eye brackets. Now, the lift adaptors may be locked into secure engagement with the eye brackets, and the crossbar may be raised until the towed vehicle is placed in an appropriate towing position. Preferably, the lift adaptors are designed to be quickly decoupled in the field so that other mechanisms, such as forks or other hook-up, tow or recovery attachment devices may be substituted in their place.

BRIEF DESCRIPTION OF THE DRAWINGS

The novel features which are characteristic of the invention are set forth in the appended claims. The invention itself, however, together with further objects and attendant advantages thereof, will be best understood by reference to the following description taken in connection with the accompanying drawings. The drawings illustrate currently preferred embodiments of the present invention. As further explained below, it will be understood that other embodiments, not shown in the drawings, also fall within the spirit and scope of the invention.

DETAILED DESCRIPTION OF THE PREFERRED EMBODIMENTS

Set forth below is a description of what are currently believed to be the preferred embodiments and/or best examples of the invention claimed. Future and present alternatives and modifications to these preferred embodiments are contemplated. Any alternatives or modifications which make insubstantial changes in function, in purpose, in structure or in result are intended to be covered by the claims of this patent.

Figure 1:
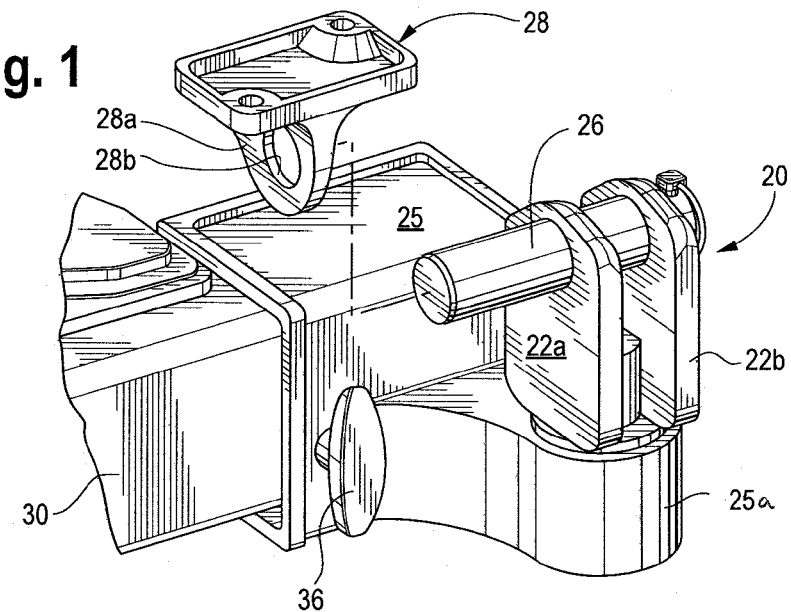
FIG. 1 is an enlarged, side and rearward perspective view of the right end of an underlift crossbar supported by a rearwardly extending, movable boom (not shown) and mounting a receiver, and including a preferred embodiment of the lift adaptor of the present invention mounted within the receiver.
Figure 2:
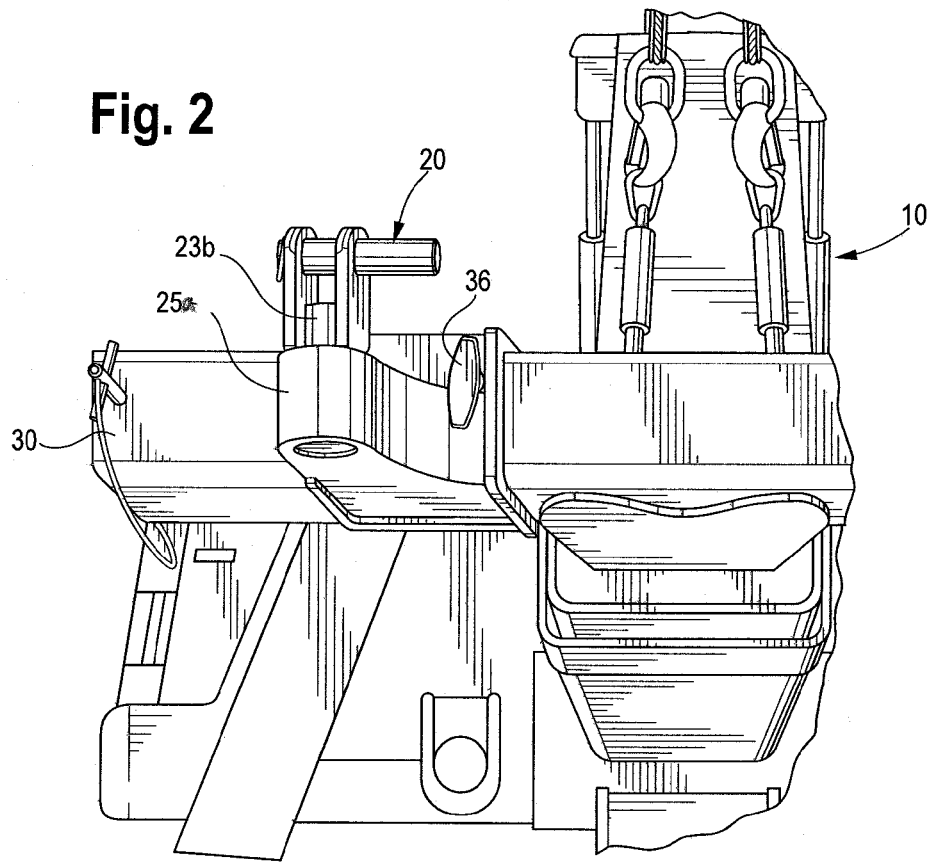
FIG. 2 is an enlarged, side and rearward perspective view of a portion of a heavy-duty recovery vehicle including a left-side receiver carrying the lift adaptor mounted on the underlift crossbar.
Figure 8:
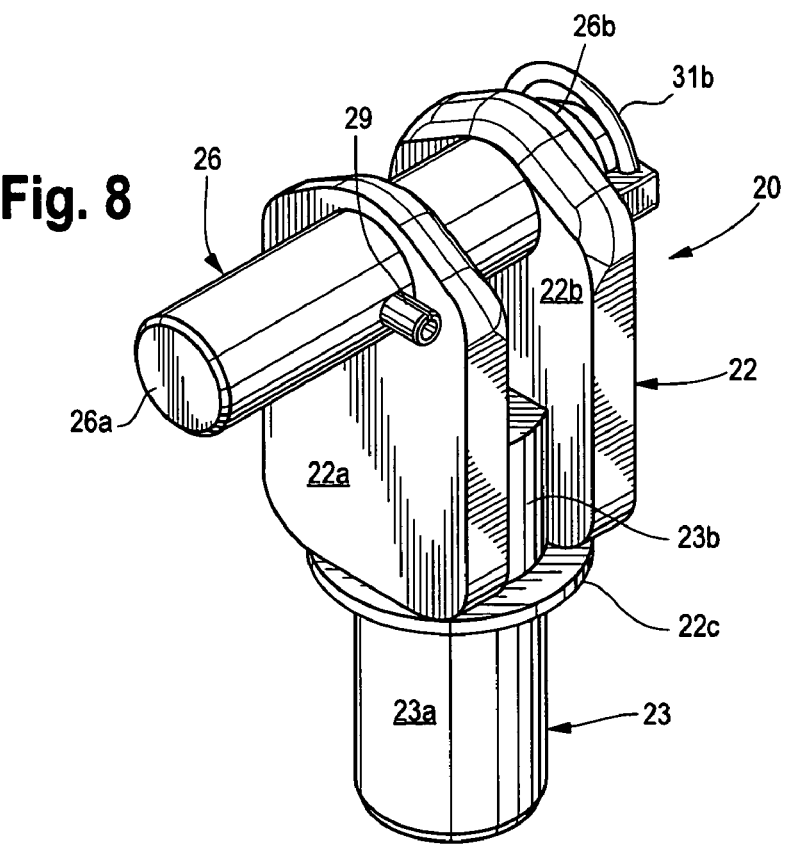
FIG. 8 is a perspective view of one preferred embodiment of the lift adaptor of the present invention.
Figure 9:
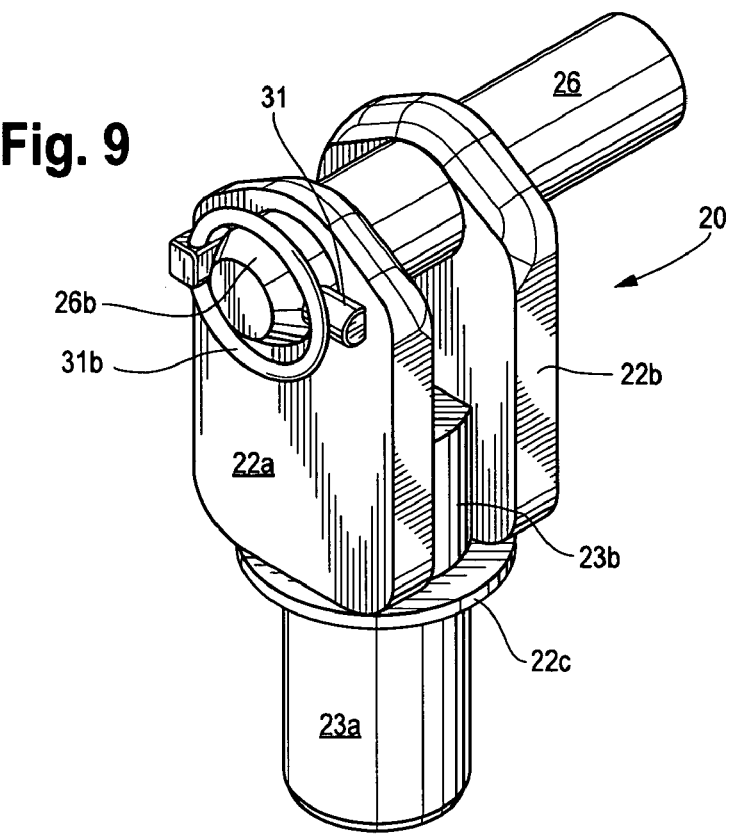
FIG. 9 is a rear view of the lift adaptor shown in FIG. 8.

Referring first to FIGS. 1, 8 and 9, a preferred embodiment of the heavy duty lift adaptor of the present invention is shown, designated generally with the reference numeral 20. In a particularly preferred embodiment, lift adaptor 20 may consist of a clevis fork, which is a single weldment consisting of bracket 22 with plates 22a and 22b, collar 22c, and shaft 23 which includes lower portion 23a and upper portion 23b.

Figure 3:
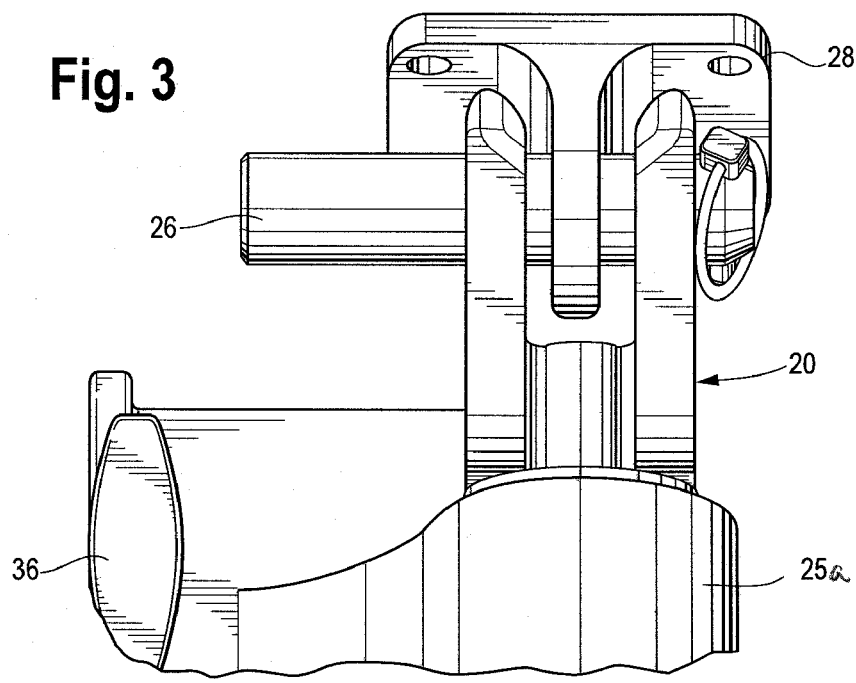
FIG. 3 is a planar, enlarged perspective view of the receiver and lift adaptor shown in FIG. 1.

Eye bracket 28 may be a preexisting piece which constitutes part of the towed vehicle, or it may be designed as a separate, interlinking piece; in either event, it need not constitute a part of lift adaptor 20. Eye bracket 28 may be pinned or otherwise attached to the underside of a bus, for example. Eye bracket 28 includes engaging end 28a and aperture 28b. Cylinder 26 engages eye 28, attaching lift adaptor 20 to the eye bracket as shown in FIG. 3, and as further explained below.

Figure 6:
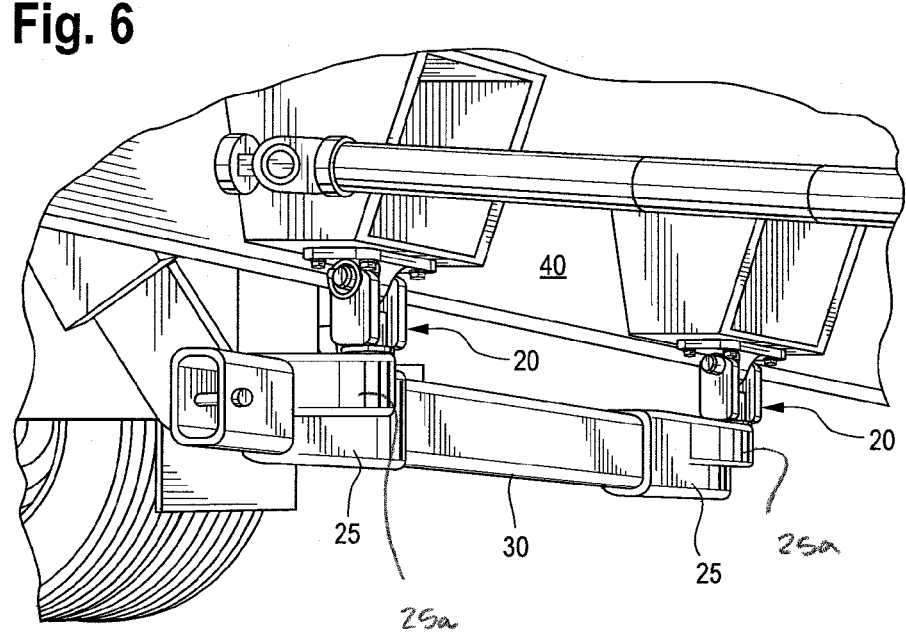
FIG. 6 is a side and rear perspective view of a portion of the vehicle to be towed in a lifted, towed position, with the lift adaptors of the present invention engaged to opposing receivers mounted on the crossbars, and with the underlift retracted within the towing vehicle's boom to minimize overhang.
Figure 16:
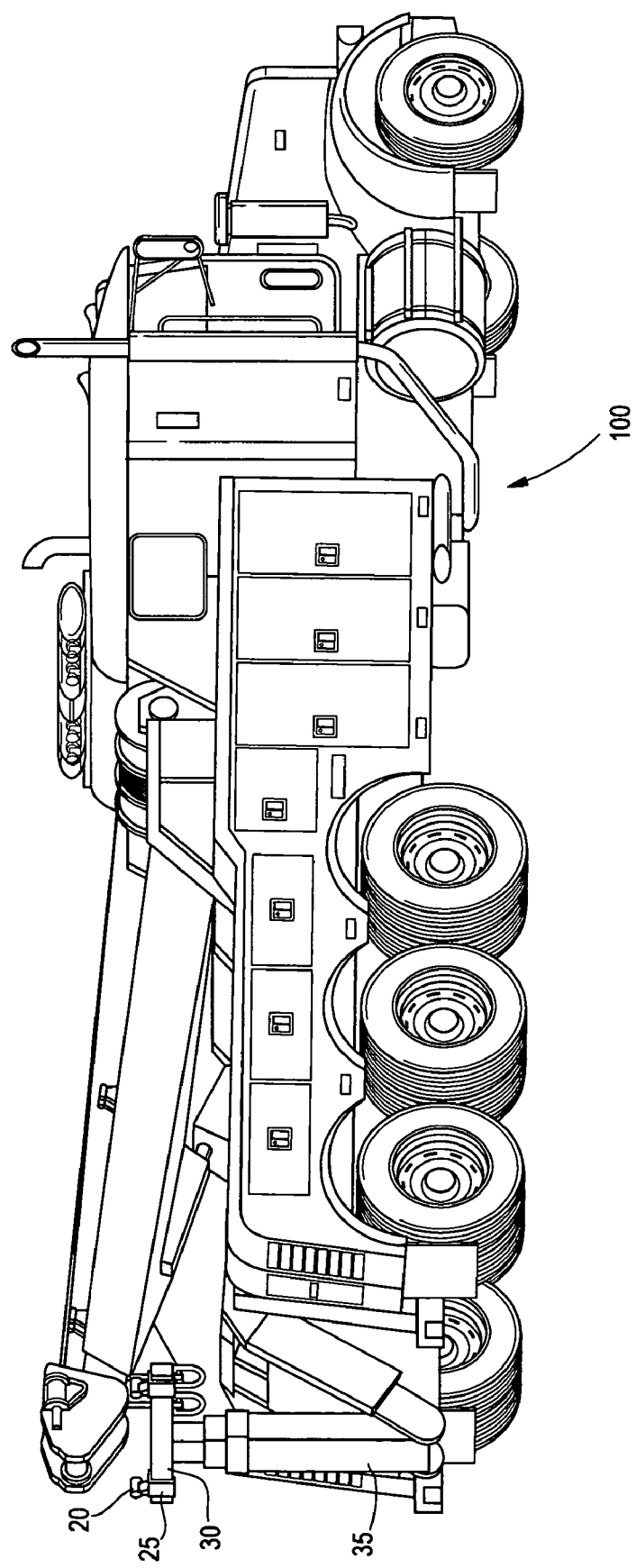
FIG. 16 is a perspective view of a conventional heavy-duty, underlift-type towing vehicle of a type that may be used in conjunction with the lift adaptor of the present invention.
Figure 17:
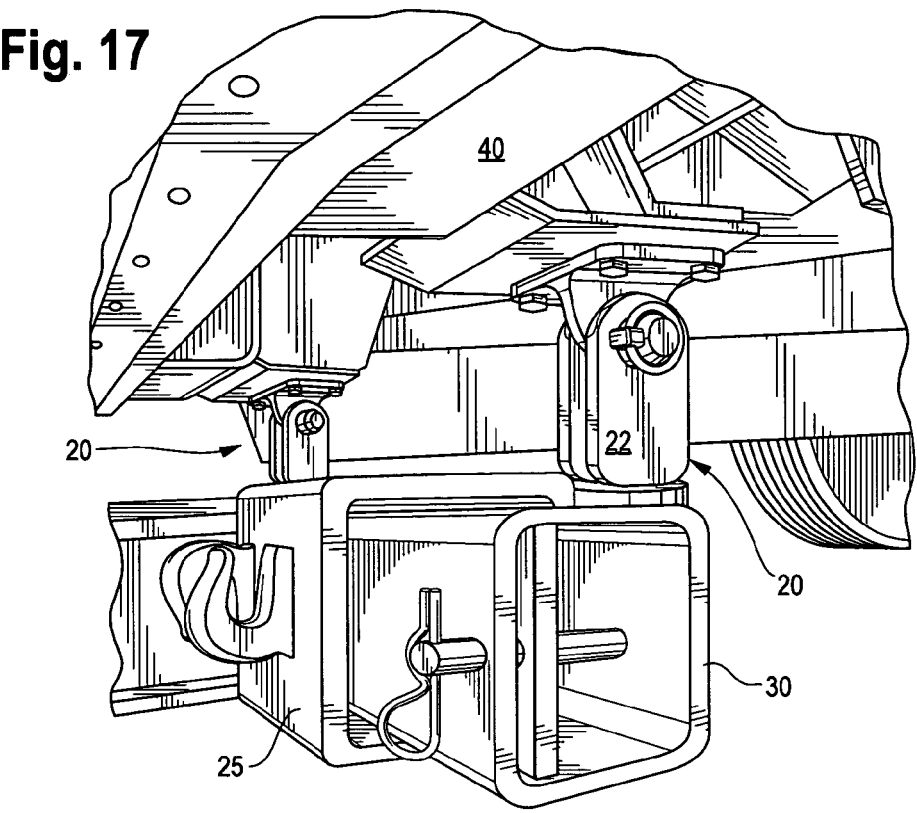
FIGS. 17 and 18 are partial, enlarged rear and side perspective views of a front portion of the heavy-duty underlift utilizing the lift adaptor invention to front tow a heavy vehicle such as a bus.
Figure 18:
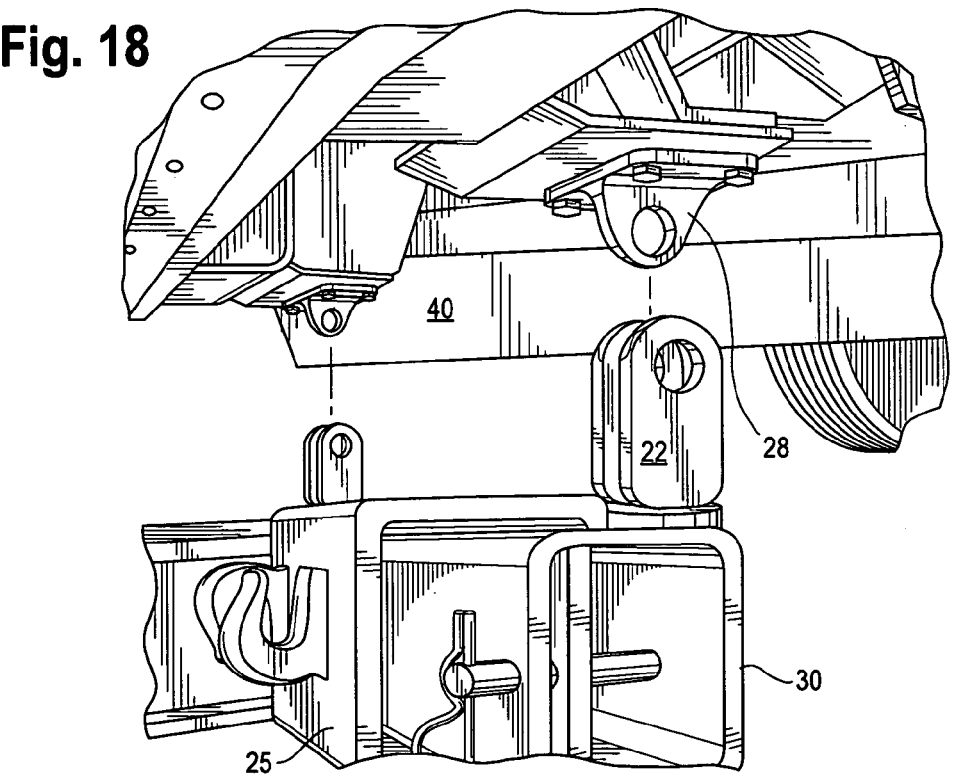

Each lift adaptor 20 may be attached to opposing ends of receivers 25 as further explained below; receivers 25 may be mounted, in turn, on opposing ends of crossbar 30, as shown in FIG. 6, for example. Referring to FIGS. 1 and 6, the rear portion 25a of receiver 25 has two positions (FIG. 1 and FIG. 6) depending on how receiver 25 is mounted on opposing ends of the crossbar 30. In FIG. 1 receiver 25 is in the upright position and is mounted on the right (or first) end of crossbar 30. In FIG. 6 receiver 25 is rotated 180° along its horizontal axis (from its position in FIG. 1) and is mounted on the left (or second, opposite) end of crossbar 30. Referring to FIGS. 1 and 3, pin 36 may be used to lock the receivers in a vertically up, stow-away position during road travel, as shown in FIG. 17. Crossbar 30 may be attached to a rearwardly-extending, movable boom 35, as shown in FIG. 16.

Figure 4:
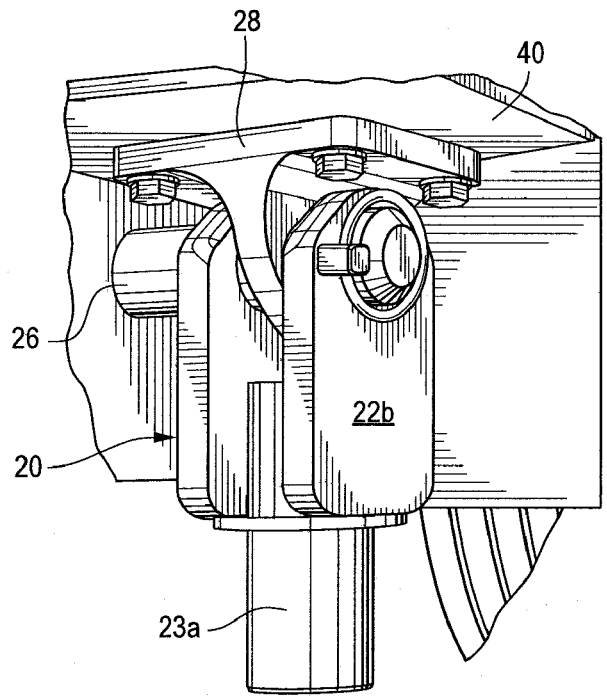
FIGS. 4-5 are side and front perspective views of the lift adaptor of the present invention which may be used for a front tow, with the lift adaptor being pinned into position on the bottom portion of a vehicle to be towed, prior to seating the distal portion of the lift adaptor into a receiver located on the underlift crossbar.
Figure 5:
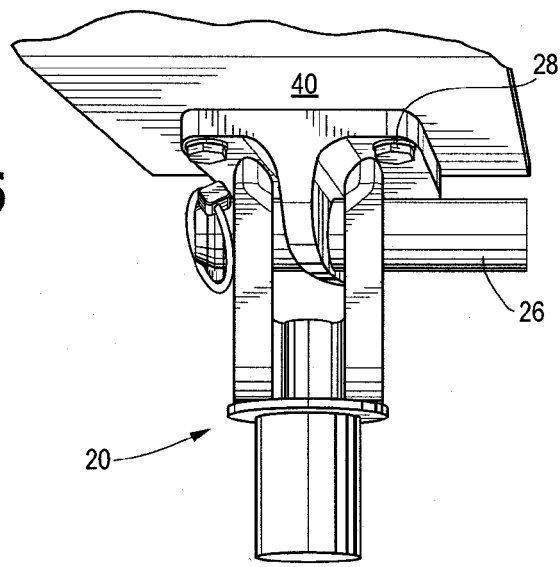
Figure 10:
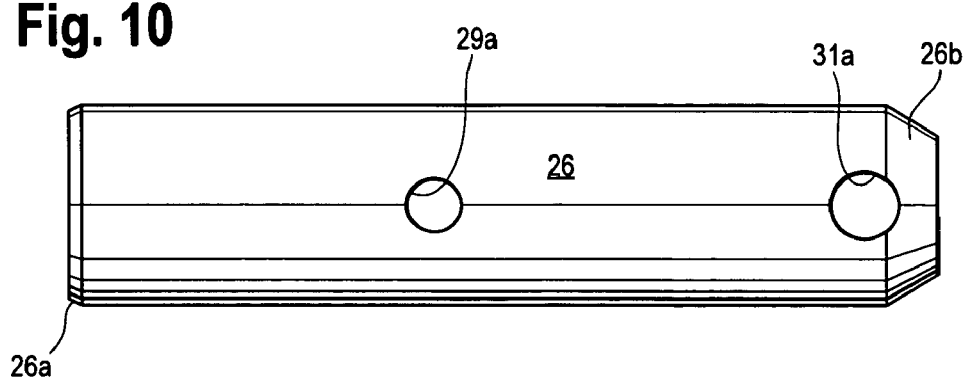
FIG. 10 is a top view of the pin of the lift adaptor shown in FIGS. 8-9.
Figure 11:
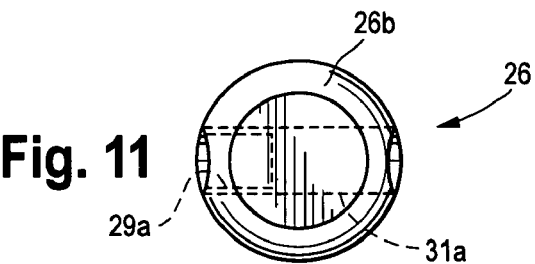
FIG. 11 is a side, cross-sectional view of the pin shown in FIG. 10.
Figure 12:
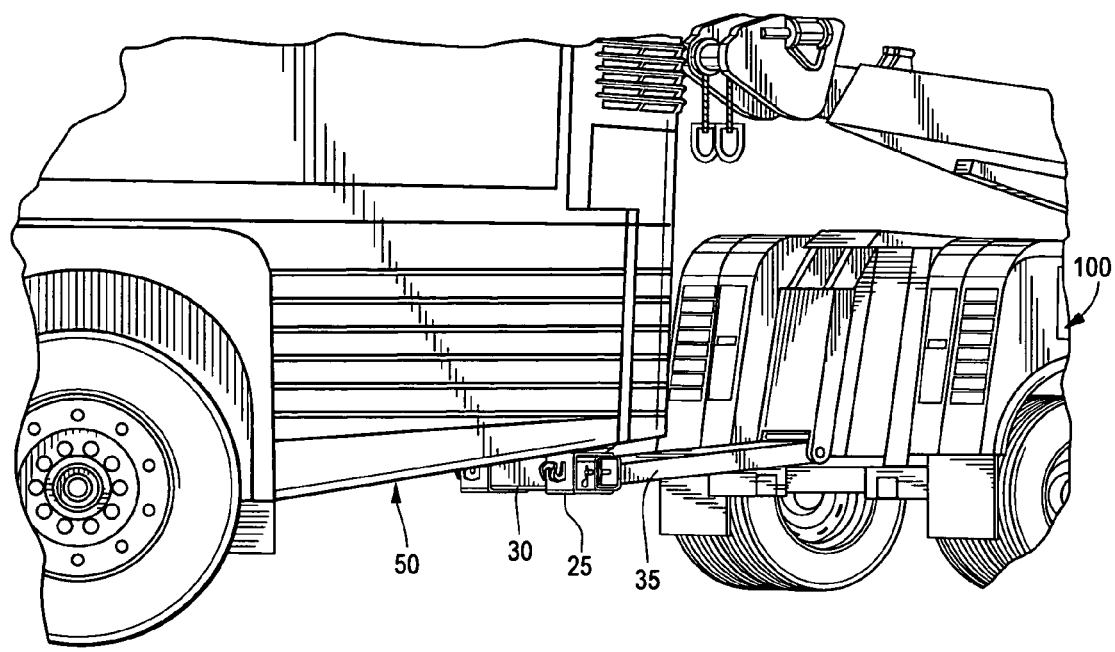
FIG. 12 is a side and rear perspective view of a rear portion of the heavy-duty underlift utilizing the lift adaptor invention to rear tow a bus.
Figure 13:
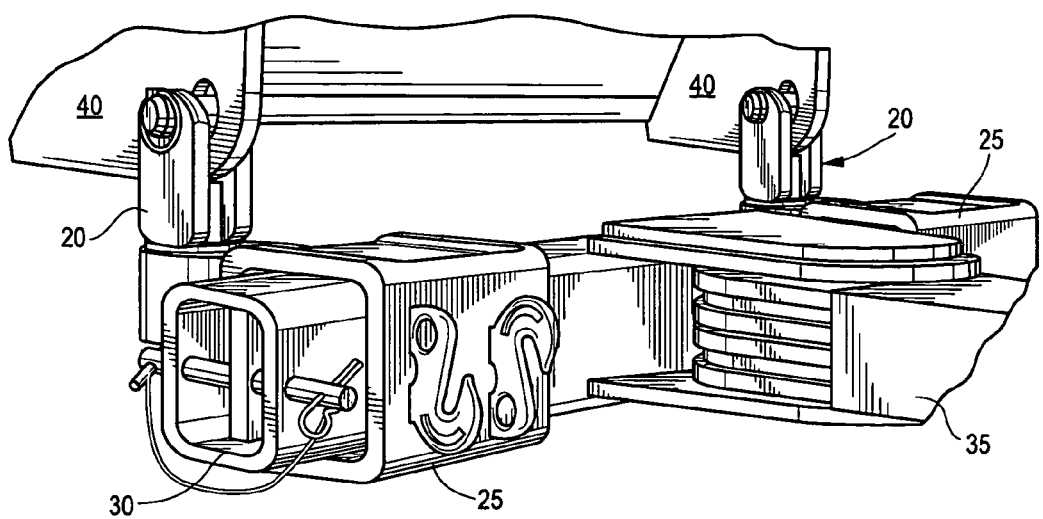
FIG. 13 is a partial, enlarged rear and side perspective view of the lift adaptor of the present invention mounted to a receiver located on the crossbar of a heavy-duty underlift, with the lift adaptor being attached to the underframe of the vehicle to be towed using an alternative attachment scheme.
Figure 14:
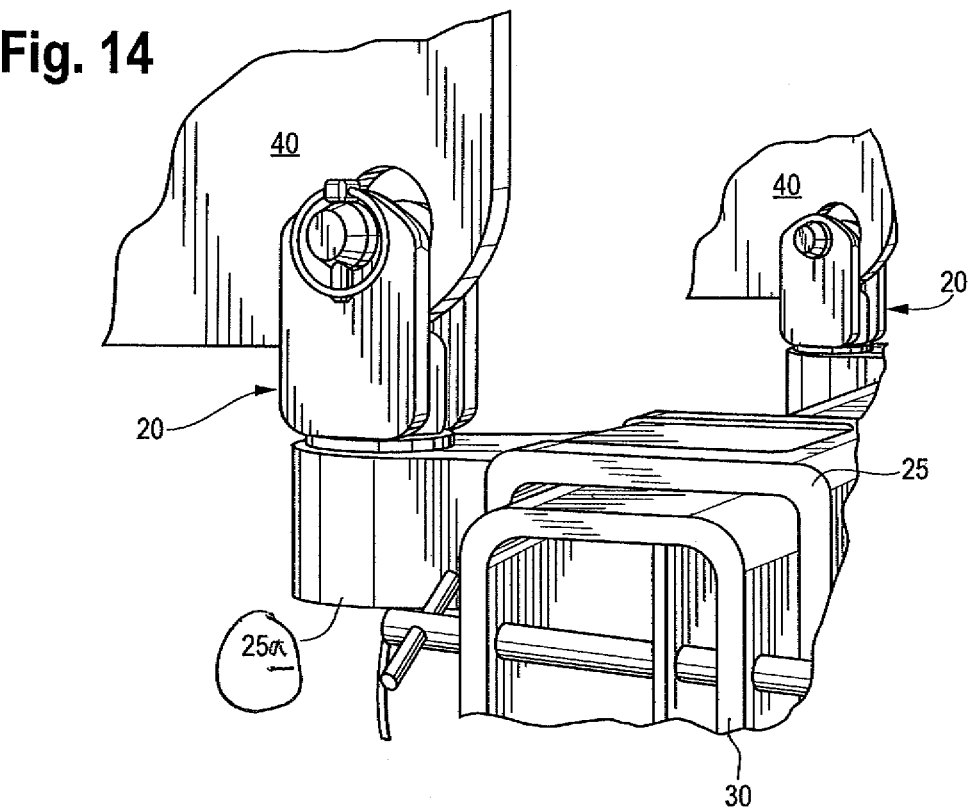
FIGS. 14 and 15 are partial, enlarged, side and rear perspective views, respectively, of the apparatus shown in FIG. 13.
Figure 15:
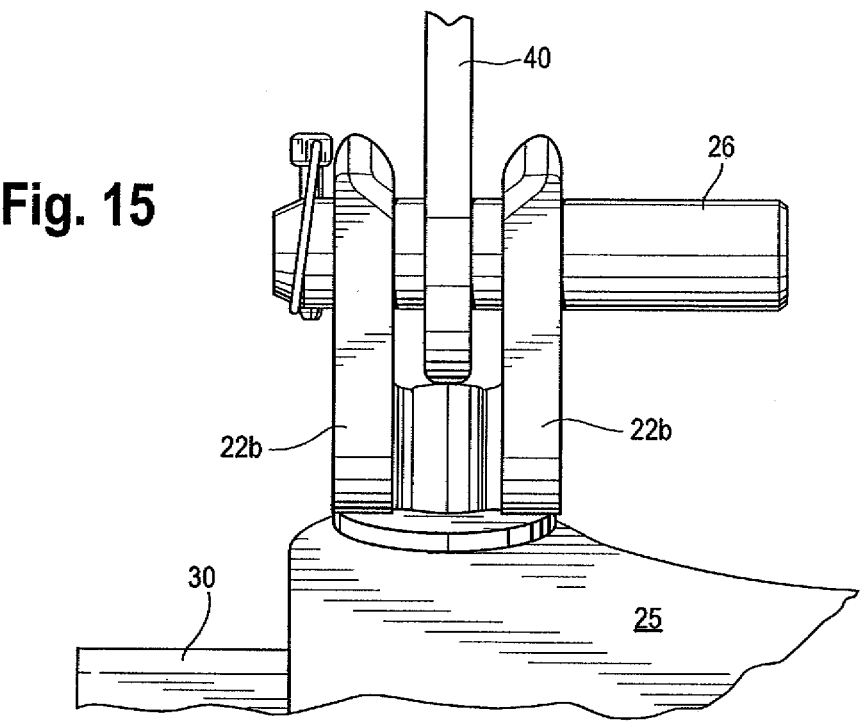

Referring to FIGS. 1 and 4, to engage lift adaptor 20 to a bus, for example, plates 22a, 22b on the upper portion of adaptor 20 are positioned so that engaging end 28a is aligned between the plates. Referring now to FIGS. 8-11, cylindrical pin 26 may now be slid through the upper apertures in plates 22a, 22b, and through aperture 28b. (Depending upon the particular application, instead of pin 26 various securing devices such as but not limited to straps or chains may be used.) Locking pin 29, a round roll pin which may be hammered into place within pin 26, for example, may be located on the periphery of cylindrical pin 26, so that lift adaptor 20 is securely attached to bracket 28. Referring to FIGS. 8-10, to secure the opposite side of cylindrical pin 26 in place between plates 22, spring-loaded ring pin 31b may be inserted through aperture 31a (FIG. 10).

By lowering and extending the underlift assembly (i.e., crossbar 30 and receivers 25) using powered, movable boom 35, each end of the crossbar may now be positioned directly below shaft end 23a of lift adaptor 20. Proper alignment may require that receivers 25 be slid along the length of the crossbar. When the receivers are correctly aligned beneath lift adaptors 20, the crossbar may be raised by the boom so that distal end 23a of each lift adaptor slides within a correspondingly-sized, upper aperture of receiver 25. To secure receivers 25 from sliding relative to the crossbar, crossbar retaining pin 41 may be inserted within an aperture located at the end of the crossbar and secured using clip 42, as shown in FIG. 7.

Figure 7:
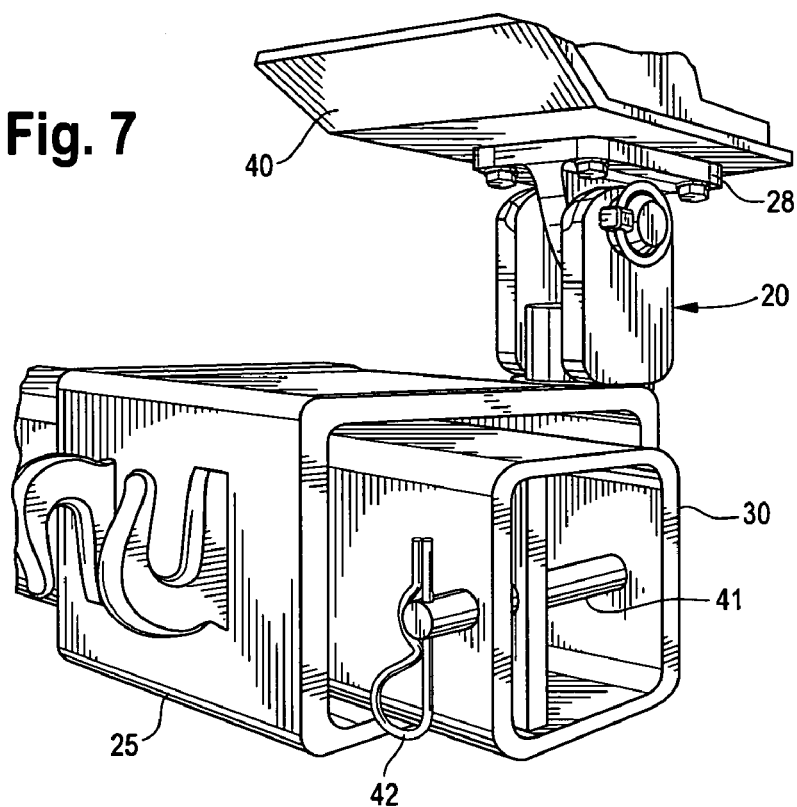
FIG. 7 is a front and side, enlarged perspective view of one side of the crossbar shown in FIG. 6.

With lift adaptor 20 now connected to the underside 40 of the vehicle 50 to be towed, boom 35 may now be powered upward, lifting crossbar 30 and thus the vehicle to be towed, into a tow position, as shown in FIGS. 6-7.

If an interconnection such as eye bracket 28 is not used, lift adaptor 20 may be directly attached by inserting cylindrical pin 26 directly through an aperture on the underside frame 40 of the vehicle 50 to be towed, as shown in FIGS. 12-15, to secure the lift adaptor to the rear of the vehicle to be towed.

Receivers 25 may be also used to quickly and removably connect forks (not shown) or other attachment and/or hook-up devices in the field.

Using the present invention, it should now be understood that it is unnecessary to tilt the underlift in order to squarely seat lift adaptors 20 on the bottom of the lifting eye of vehicle 50. Preferably, the underlift boom is maintained in a generally parallel location to the towed vehicle frame, so that the adaptors fit evenly into the eye. It will also be understood that hook-up, lifting and towing using the present invention may be accomplished without the need to contact any other components of the towed truck than those identified above, and without concern for damaging air suspension parts, air lines, engine parts, coolant lines, radius rods, electrical wiring, etc.

In the past, there may have been some concern in utilizing a relatively small lift adaptor for heavy-duty vehicle recovery. However, it should now be understood and appreciated that the underlift crossbar and the receivers carry most of the transferred weight of the towed vehicle. In contrast, lift adaptors 20 primarily constrain the towed vehicle 50 from front-and-back movement. In any event, for safety, adaptors according to the present invention are designed to provide a carrying capacity of up to 26,000 pounds used with Class 7 or Class 8 vehicles.

It should now be appreciated that the lift adaptor of the present invention may be used for front (e.g., FIGS. 4-5 and 17-18) or rear (e.g., FIGS. 12-15) tows.

To properly employ the lift adaptor of the present invention in a rear hook-up, for safety reasons, the rear axle, when needed (not all buses have dual rear axles, for example), should be chained before raising the towed vehicle to a towed position. This eliminates hyper-extension of the raised axle, which may cause suspension damage.

Figure 19:
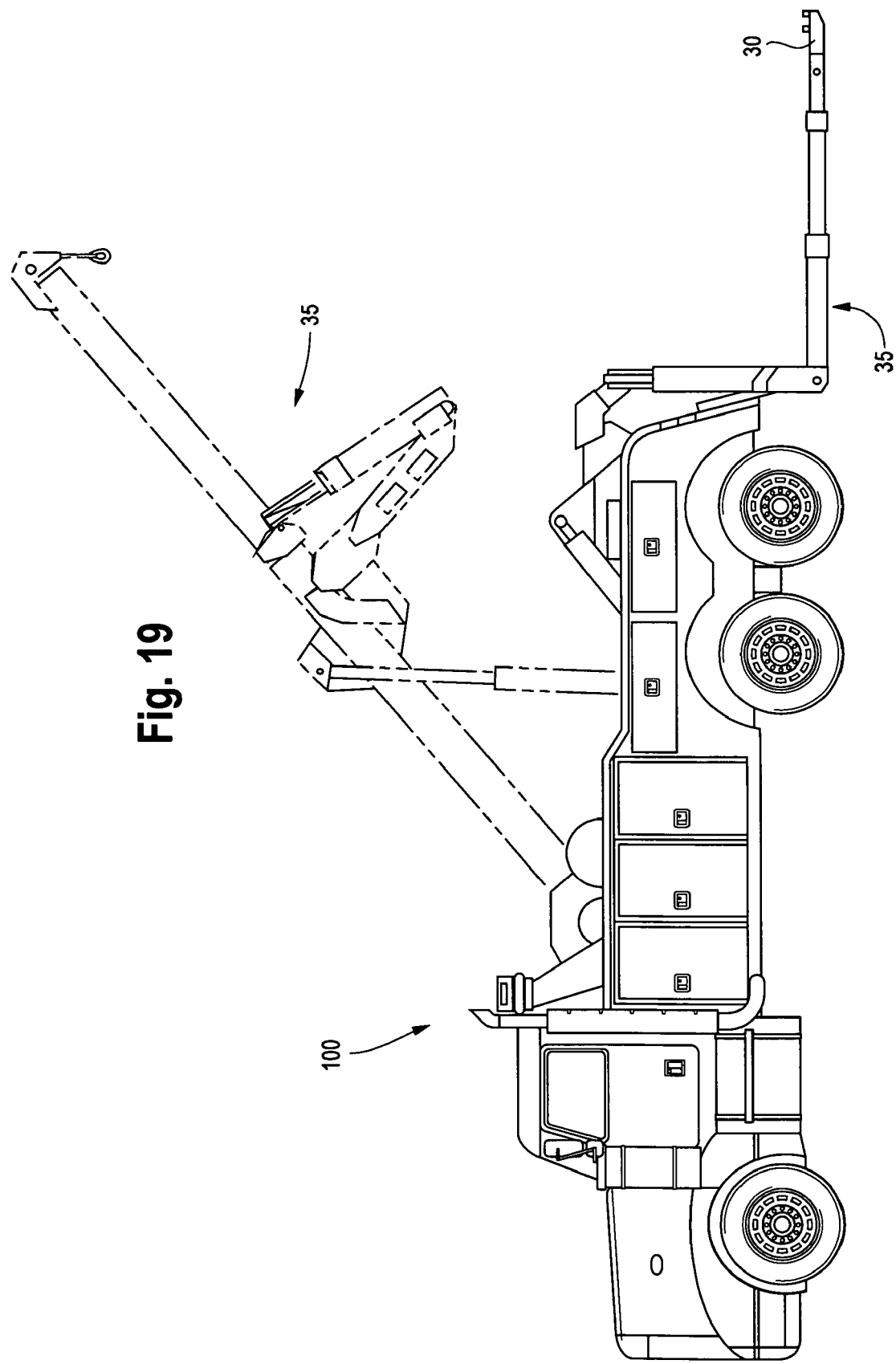
FIG. 19 is a perspective view of an integrated heavy-duty, underlift-type towing vehicle of a type that may be used in conjunction with the lift adaptor of the present invention, with exemplary upward movement of the boom shown in dotted lines.

Referring now to FIGS. 16 and 19, the adaptors of the present invention may be used with virtually any type of heavy-duty vehicle 100 employing an underlift having appropriately-sized fork receivers with a hole diameter of two inches, including conventional units (e.g., FIG. 16) such as the Century Super Duty and Challenger Heavy Duty Underlifts, as well as underlift-type integrated units (e.g., FIG. 19) such as the Century 7035 or the Vulcan V100, all of which are available from Miller Industries, Inc of Ooltewah, Tenn.

Referring back to FIGS. 8 and 9, although different sizes and shapes may be employed by a person of ordinary skill in this art in keeping with the principles of the invention as disclosed here, in one preferred embodiment, a lift adaptor made according to the following dimensions was used: collar diameter of 3 inches; shaft diameter of 2 inches; lower shaft 23a height of 3¼ inches; total shaft height of 5 inches; collar thickness of 3/16 inches; plate height (to the center of aperture through which pin 26 passes) of 4 inches; aperture through which pin 26 passes has a diameter of 1.41 inches; plate width of 3 inches; an overall height of the lift adaptor of 8 and 7/32 inches; and a thickness for each plate of about 5/8 inches. Preferred dimensions for pin 26 are: a 1 and 3/8 inch diameter; a 6-inch length; a 1/16 by 45° chamfer end 26a; a 3/8-inch by 30° chamfer end 26b; A preferred pin is made of zinc-plated silver.

It will be understood that various modifications to the preferred embodiment disclosed above may be made. The above description is not intended to limit the meaning of the words used in the following claims that define the invention. Rather, it is contemplated that future modifications in structure, function or result will exist that are not substantial changes and that all such insubstantial changes are intended to be covered by the following claims.

I claim:

1. A lift adaptor used by a tow vehicle to tow a second vehicle, the tow vehicle having an underlift crossbar supporting a pair of slidable receivers mounted on opposing ends of the crossbar and to which the lift adaptor is mounted, the lift adaptor having a generally upright orientation relative to the crossbar and comprising:

a first portion and a second portion;

the first portion comprising a vertically extending cylindrical shaft adapted to drop down at least partially within and be supported by an aperture on the receiver during towing, the shaft defining a vertical axis relative to the ground when at least a portion of the shaft is located within the aperture of the receiver and the lift adaptor is thereby in the generally upright orientation;

the second portion being adapted to connect to and support an underside portion of the towed vehicle during towing; and wherein the height of the lift adaptor is adjustable relative to the crossbar by switching each receiver to an opposite end of the crossbar while maintaining the generally upright orientation of the lift adaptor.

2. The lift adaptor of claim 1, wherein an eye bracket is attached in a non-welded manner to the underside portion of the towed vehicle and to the second portion of the lift adaptor during towing.

3. The lift adaptor of claim 2, wherein a horizontally-extending shaft is used to interconnect the eye bracket with the second portion of the lift adaptor.

4. The lift adaptor of claim 3, wherein the horizontally-extending shaft has a diameter of about 1 and 3/8 inches.

5. The lift adaptor of claim 1, wherein the second vehicle comprises a Class 7 or Class 8 vehicle.

6. The lift adaptor of claim 1, wherein the second vehicle comprises a bus, coach, motor home, truck or tractor.

7. The lift adaptor of claim 1, wherein the second vehicle comprises a bus, motor home or coach.

8. The lift adaptor of claim 1, wherein the second portion two parallel plates interconnected by a horizontally-extending shaft, and wherein the plates each include an aperture accepting the horizontally-extending shaft, and wherein the horizontally-extending shaft may be secured to an eye bracket connected to the underside portion of the towed vehicle.

9. The lift adaptor of claim 1, wherein the second portion of the lift adaptor is directly connected to the underside portion of the towed vehicle.

10. The lift adaptor of claim 9, wherein the second portion of the lift adaptor comprises two parallel plates each having an aperture, and a horizontally-extending shaft insertable through the apertures and through an underside portion or portions of the towed vehicle.

11. The lift adaptor of claim 1, wherein the lift adaptor is designed to be used for Class 7 and Class 8 vehicles.

12. The lift adaptor of claim 1, wherein the vertically extending cylindrical shaft has a diameter of about two inches.

13. The lift adaptor of claim 12, wherein the vertically-extending shaft is made of zinc-plated silver.

14. The lift adaptor of claim 1, wherein the lift adaptor is used to tow the second vehicle from the rear of the tow vehicle.

15. The lift adaptor of claim 1, wherein the lift adaptor is used to tow the second vehicle from the front of the tow vehicle.

16. The lift adaptor of claim 1, wherein the height of the lift adaptor is adjustable by relocating the receivers relative to the crossbar.

* * * * *